(No Model.)
W. J. ADAM.
PORTABLE GRANARY.
No. 500,458. Patented June 27, 1893.
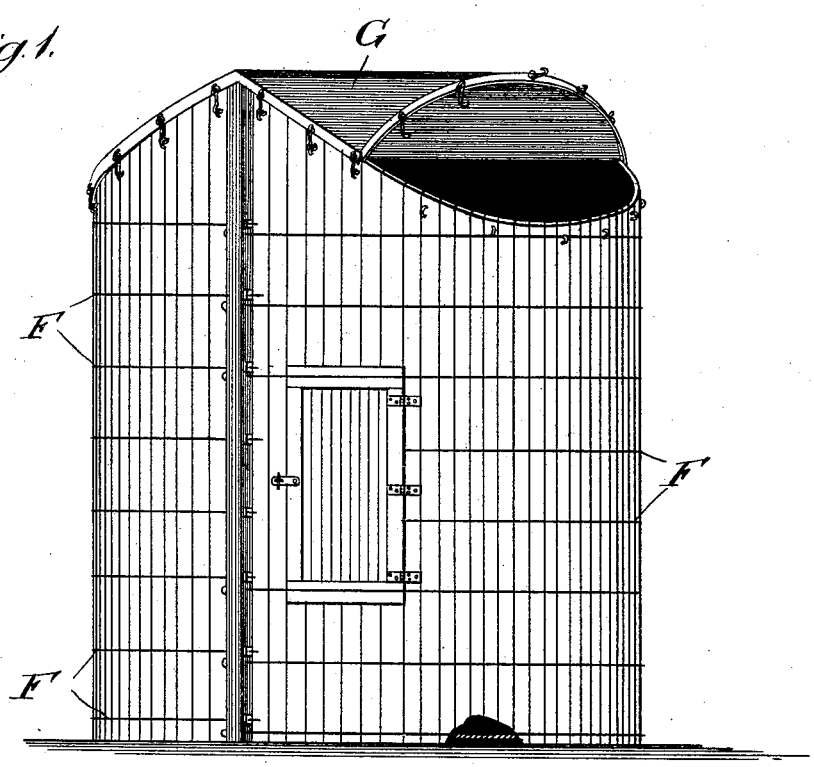
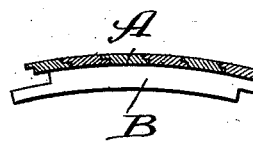
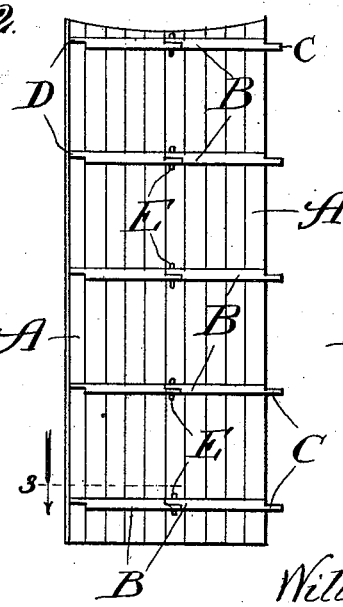
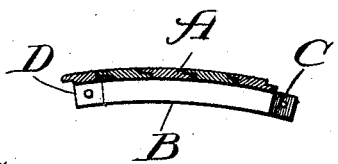
Witnesses:
Inventor:
William J. Adam,

UNITED STATES PATENT OFFICE.

WILLIAM J. ADAM, OF JOLIET, ILLINOIS.

PORTABLE GRANARY.

SPECIFICATION forming part of Letters Patent No. 500,458, dated June 27, 1893.

Application filed April 23, 1892. Serial No. 430,320. (No model.)

*To all whom it may concern:*

Be it known that I, WILLIAM J. ADAM, a citizen of the United States, residing at Joliet, Will county, Illinois, have invented certain new and useful Improvements in Portable Granaries of which the following is a specification.

In the drawings, Figure 1 is a side elevation of my improved portable granary. Fig. 2 is a view of two of the sections of which the granary is composed, as seen from the inside, coupled together. Fig. 3 is a plan view of one section taken in the line 3 of Fig. 2; and Fig. 4 is a modification of the interlocking ends of the segmental sections.

In making my improved portable granary, I take a number of staves or slats A, and fasten them in any desired manner to transverse segmental sections B. These sections may be arranged throughout the length of the staves at any desired distance apart to secure the requisite strength. These segmental sections are provided on their opposite ends with underlaps C, and overlaps D, formed by cutting away a portion of each end of the segmental sections, so that each section will interlock with the next adjacent section, though ordinary tongues and grooves at the ends of the segmental sections may be used for interlocking them together if preferred, as shown in Fig. 4. Holes are made through the ends of the sections, so that pins or bolts E may be passed through the interlocking ends when the sections are arranged in place to securely hold and fasten them together. To further secure the sections of staves together and enable them to withstand the internal pressure of the grain, I arrange at one side of the granary an upright tying strip, in which one end of the wire or band F is fastened, while the other end is passed entirely around the granary and through a hole in the strip, and secured by a nut screwed on to the end, so that it may be tightened or adjusted in place. It will be understood that these wires or bands are drawn around the granary after the sections of staves have been put together, and before it is filled. If preferred, however, other means of fastening the ends of the wires instead of threads and nuts may be employed. The wires or bands, at the place where a door is used, would of course be fastened to the piece or strip on which the door is hinged, as shown in Fig. 1, so as not to pass the opening.

I provide the granary with a top G, so that it may be covered to protect the grain from the weather or depredations. This cover is preferably composed on its under side of strips, as shown in the portion upturned in Fig. 1, and on the outside with an oil canvas, so that it will be light and flexible, while at the same time affording protection from rains or storms. The cover is provided with hooks and eyes, as shown in Fig. 1, so that it may be adjusted and fastened in place. By making the cover in strips, as above, a part of it may be turned up, as shown in Fig. 1, to permit ingress to the interior of the granary.

What I regard as new, and desire to secure by Letters Patent, is—

1. In a portable granary, the combination of segmental sections each provided with its strips or staves, the end of one section interlocking with the adjacent section, substantially as described.

2. In a portable granary, the combination of segmental sections each provided with its strips or staves, the end of one section interlocking with the adjacent section, and a tying strip provided with wires or bands encircling the whole, substantially as described.

3. In a portable granary, the combination of segmental sections each provided with its strips or staves, the end of one section interlocking with the adjacent section, and a flexible cover inclosing the granary and held in place by hooks and eyes, substantially as described.

WILLIAM J. ADAM.

Witnesses:
EPHRAIM BANNING,
SAMUEL E. HIBBEN.